(12) United States Patent
Liu et al.

(10) Patent No.: US 6,457,938 B1
(45) Date of Patent: Oct. 1, 2002

(54) WIDE ANGLE GUIDE VANE

(75) Inventors: Hsin-Tuan Liu, West Chester, OH (US); Brent Franklin Beacher, Hamilton, OH (US); Robert Bruce Dickman, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/821,994

(22) Filed: Mar. 30, 2001

(51) Int. Cl.[7] .............................................. F01D 17/16
(52) U.S. Cl. ....................................... 415/160; 415/148
(58) Field of Search ................................ 415/148, 159, 415/160; 416/243, 223 R, DIG. 2

(56) References Cited

U.S. PATENT DOCUMENTS

| | | | |
|---|---|---|---|
| 3,632,224 A | * | 1/1972 | Wright et al. ............. 415/149.4 |
| 4,431,376 A | | 2/1984 | Lubenstein et al. |
| 5,203,676 A | | 4/1993 | Ferleger et al. |
| 5,352,092 A | | 10/1994 | Ferleger et al. |
| 5,554,000 A | | 9/1996 | Katoh et al. |
| 5,961,290 A | * | 10/1999 | Aoki et al. ............. 416/223 R |
| 6,264,429 B1 | * | 7/2001 | Koeller et al. .......... 416/233 A |

OTHER PUBLICATIONS

Dunavant, "Cascade Investigation of a Related Series of 6–Percent–Thick Guide–Vane Profiles and Design Charts." Technical Note 3959, National Advisory Committee for Aeronautics, May, 1957, 49 pgs.

* cited by examiner

Primary Examiner—Edward K. Look
Assistant Examiner—Dwayne J. White
(74) Attorney, Agent, or Firm—Nathan D. Herkamp; Francis L. Conte

(57) ABSTRACT

A variable inlet guide vane includes opposite pressure and suction sides extending along a chord between leading and trailing edges and in span from root to tip. The vane has a maximum thickness greater than about eight percent chord length and located less than about thirty-five percent chord length from the leading edge.

20 Claims, 2 Drawing Sheets

WIDE ANGLE GUIDE VANE

BACKGROUND OF THE INVENTION

The present invention relates generally to gas turbine engines, and, more specifically, to inlet guide vanes therein.

A turbofan gas turbine engine configured for powering an aircraft in flight includes in serial flow communication a fan, low and high pressure compressors, combustor, and high and low pressure turbines. Air is pressurized in the compressors and mixed with fuel in the combustor for generating hot combustion gases which flow downstream through the turbines which extract energy therefrom. The high pressure turbine powers the high pressure compressor through a shaft therebetween, and the low pressure turbine powers the fan and low pressure compressor through another shaft therebetween.

The engine operates at various power levels including idle, cruise, takeoff, and maximum power as required for the proper operation of the aircraft over its intended flight envelope. In a typical commercial passenger aircraft application, fuel consumption is a primary design objective, and the engine is therefore specifically designed to maximize fuel efficiency at cruise operation.

Accordingly, the various stator airfoils and rotor blades in the fan, compressor, and turbines are preferably configured for maximizing aerodynamic performance at the cruise design point or condition. Correspondingly, aerodynamic performance changes at the off-design conditions not associated with cruise.

Such off-design operation is particularly significant in variable inlet guide vanes in the compressor. The typical turbofan compressor is a multistage axial compressor having many rows of stator vanes and rotor blades through which air is pressurized in turn. Fixed stator vanes are typically used in the downstream stages of the compressor, with variable stator vanes being used in the upstream stages thereof.

And, a row of variable inlet guide vanes is provided at the entrance of the high pressure compressor for optimizing performance thereof over the desired flight envelope including cruise to maximum power operation of the engine. The various compressor vanes and blades are therefore configured in aerodynamic profile for maximizing compression efficiency without unacceptable flow separation or undesirable compressor stall.

Efficient aerodynamic profiles for compressor airfoils including stator vanes and rotor blades have been available for many decades, and may be found in considerable detail in reports prepared by the National Advisory Committee for Aeronautics (NACA). For example, in NACA Technical Note 3959, published in May 1957, vane profiles and design charts are presented for the NACA 63-006 series of 6-percent-thick guide vanes. The specific airfoil series presented in this technical note is the NACA 63-($Cl_0A_4K_6$)06 guide-vane profile.

This NACA-63 series vane profile includes a maximum thickness-to-chord length of six percent (6%), which is located at thirty-five percent (35%) chord length from the leading edge of the airfoil. The corresponding leading edge radius is 0.297 percent chord, and the trailing edge radius is 0.6 percent chord. This profile is readily scalable to include maximum thicknesses greater than 6% C, including 8% C and higher, at the same 35% chord location.

The NACA 6% guide vane profile is one of a series of profiles which vary in configuration including maximum airfoil thickness. The various NACA profiles have been available for decades for use in designing efficient gas turbine engine compressor airfoils.

For example, the NACA-63 series airfoil is found in turbofan gas turbine engines enjoying many years of successful commercial use in this country, as well as abroad. In particular, the NACA-63 series profile has been used in a variable inlet guide vane of a high power commercial turbofan aircraft engine.

The NACA profile has good aerodynamic performance and efficiency at the specific design condition for the variable vane, which is typically at the cruise angle of attack. Accordingly, when the guide vane is rotated to its nominal or zero angular position corresponding with the design condition, such as cruise, the aerodynamic profile thereof provides acceptable performance without undesirable flow separation of the air flowing thereover.

However, the variable vane must be rotated over a range of turning angles having correspondingly different angles of attack relative to the airflow entering the compressor. This angular range includes a relatively closed angular position associated with low power or idle operation of the engine at one extreme, and at the opposite extreme of angular position the vanes are rotated to a relatively open position corresponding with maximum power operation of the engine. And, the vanes are positioned between these two opposite end positions for intermediate power operation of the engine such as cruise over a corresponding cruise range of turning angles centered at zero degrees.

In a current development program for a derivative turbofan engine, a wide range of variable inlet guide vane angular position is desired including twenty-four degrees (24°) maximum open position and sixty degrees (60°) maximum closed position for a total range of eighty-four degrees (84°). This wide range of vane angular position has correspondingly wide and different angles of attack relative to the incoming airflow.

Analysis has uncovered substantial flow separation on the pressure side of the vane at the maximum open angular position, and along the suction side of the vane at the maximum closed position for the conventional NACA-63 series of guide vane profiles. Although good compressor performance of the variable inlet guide vanes may be obtained at and near the design condition corresponding with a narrow angular range centered on zero degrees, the compressor will experience poor off-design performance including undesirable flow separation at the opposite ends of the wide angular range of operation.

Accordingly, it is desired to provide an improved variable inlet guide vane having improved off-design performance over a wide angular range of operation.

BRIEF SUMMARY OF THE INVENTION

A variable inlet guide vane includes opposite pressure and suction sides extending along a chord between leading and trailing edges and in span from root to tip. The vane has a maximum thickness greater than about eight percent chord length and located less than about thirty-five percent chord length from the leading edge.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
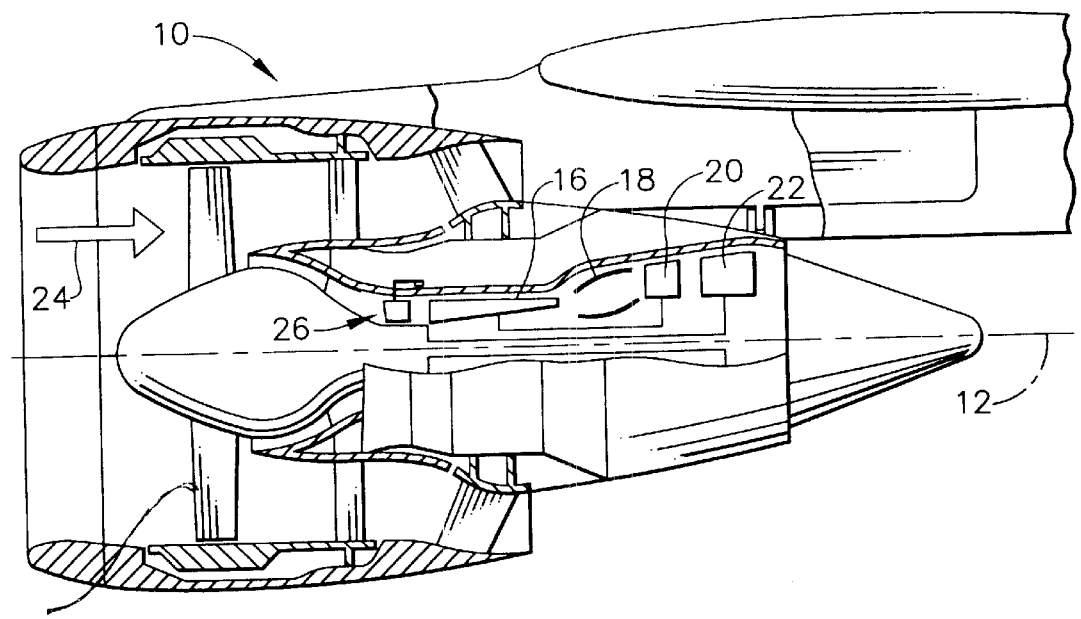
FIG. 1 is a partly sectional side view of an exemplary turbofan gas turbine engine configured for powering an aircraft in flight.

Illustrated in FIG. 1 is an exemplary turbofan gas turbine engine 10 configured for powering an aircraft (shown in part) in flight over a suitable flight envelope including power levels ranging from idle, cruise, takeoff, and maximum power for example. The engine is axisymmetrical about a longitudinal or axial centerline axis 12, and includes in serial flow communication a fan 14, compressor 16, combustor 18, high pressure turbine 20, and low pressure turbine 22.

Air 24 enters the inlet of the engine and is pressurized by the fan for producing propulsion thrust, with an inner portion of the air being channeled into the high pressure compressor 16 wherein it is suitably pressurized. The pressurized air is discharged into the combustor wherein it is mixed with fuel and ignited for generating hot combustion gases which flow downstream through the two turbines 20,22 that extract energy therefrom. The high pressure turbine 20 powers the high pressure compressor 16 through a corresponding shaft therebetween, and the low pressure turbine 22 powers the fan through a corresponding shaft therebetween.

Figure 2:
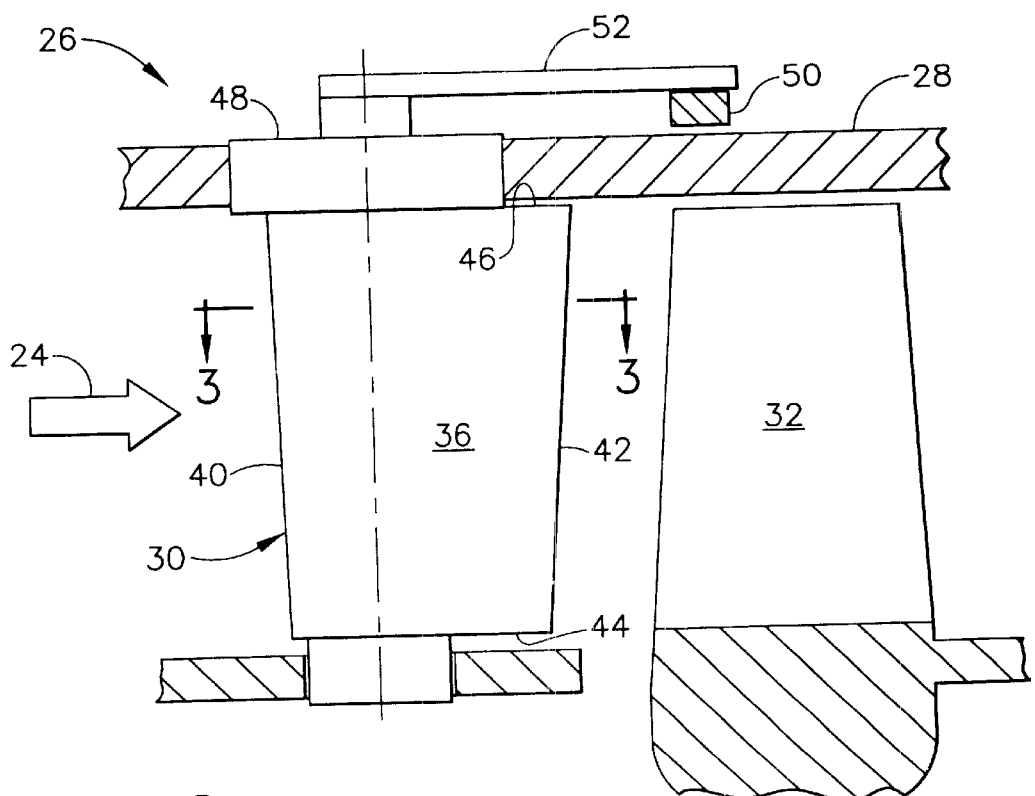
FIG. 2 is an enlarged partly sectional axial view of a variable inlet guide vane at the entrance of the compressor of the engine illustrate d in FIG. 1.

Disposed at the entrance of the high pressure compressor 16 is a compressor stator 26 which is illustrated schematically in more detail in FIG. 2. The stator 26 includes an annular casing 28 and suitably supports therein a row of variable inlet guide vanes 30 extending radially inwardly from the casing. The guide vanes channel the incoming air 24 to a first stage row of compressor rotor blades 32 which extend radially outwardly from a supporting rotor disk or drum.

The first row of blades 32 is one of several rows which define corresponding stages of the compressor having intervening stator vanes therebetween which pressurize the air in turn for subsequent delivery to the combustor. But for the variable inlet guide vanes 30, the remainder of the engine, including the high pressure compressor 16, may have any conventional configuration.

Figure 3:
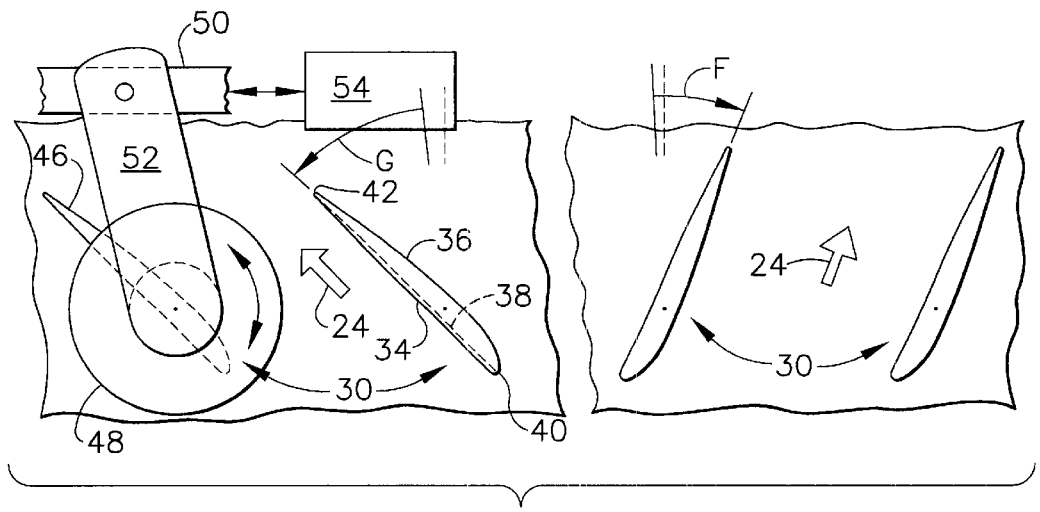
FIG. 3 is a top platform view of exemplary variable inlet guide vanes illustrated in FIG. 2 and taken a long line 3—3 in correspondingly open and partially closed angular positions.

As illustrated in FIGS. 2 and 3 each vane 30 is in the form of an airfoil having a first or pressure side 34 and a circumferentially opposite second or suction side 36 which define the aerodynamic surfaces of the vane over which the air flows during operation. The two sides 34,36 extend axially along a chord 38 between opposite leading and trailing edges 40,42, and radially in span from a radially inner root 44 to a radially outer tip 46. The vane preferably twists in radial cross section up to about 15 degrees over its span, but may otherwise vary as desired for maximizing aerodynamic performance thereof.

Each vane 30 is a unitary or one-piece component and includes an integral cylindrical trunnion or spindle 48 extending radially outwardly from the vane tip and through a complementary cylindrical aperture in the casing. The spindle is conventionally mounted in the casing for rotation therein and is integrally or fixedly joined to the vane tip for rotating the vane as desired during operation. The vane root includes a corresponding trunnion mounted in an aperture in an inner support or frame component.

As shown in FIGS. 2 and 3, an actuation ring 50 is pivotally joined to each of the vane spindles by a corresponding lever arm 52 for rotating the vanes in unison in accordance with the particular operation of the engine. A suitable actuator 54, shown in FIG. 3, rotates the ring 50 when desired for in turn rotating the lever arms 52 and rotating the individual vanes 30 within the casing.

Figure 4:
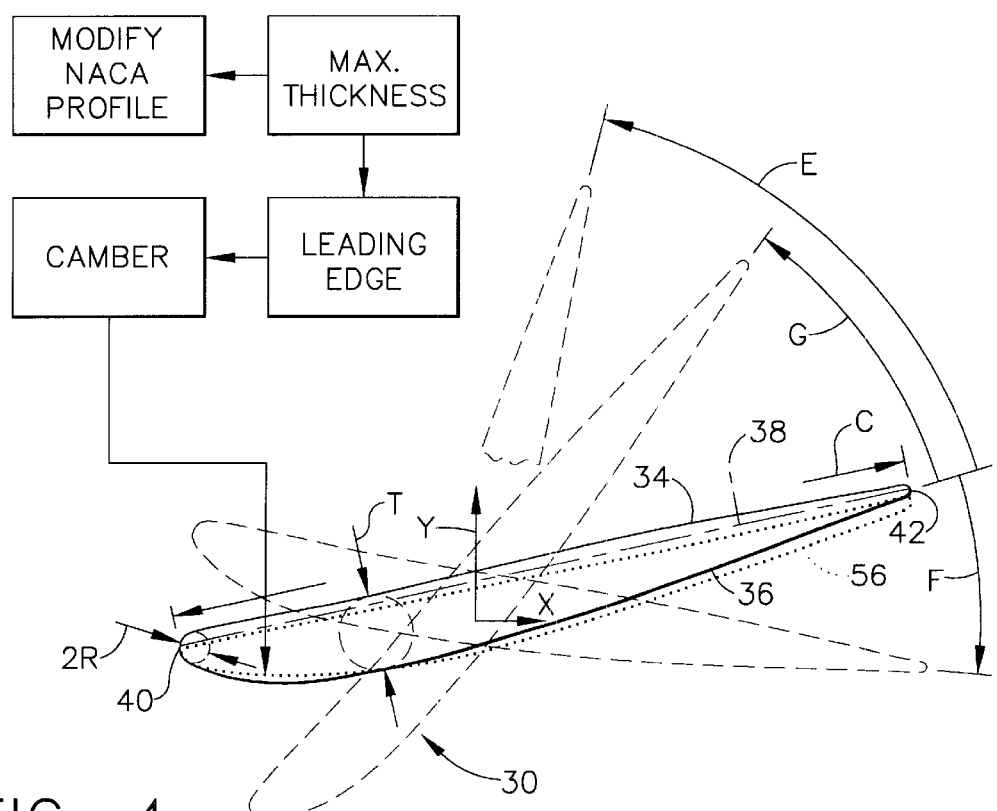
FIG. 4 is an enlarged view of an exemplary one of the variable inlet guide vanes of FIGS. 2 and 3 having a profile in accordance with an exemplary embodiment of the present invention modified from a conventional NACA profile illustrated schematically in flowchart form.

FIG. 4 illustrates an exemplary radial section of one of the variable inlet guide vanes 30 in solid line in its nominal angular position corresponding with the design condition such as cruise operation, with a corresponding angle of attack relative to the incoming airflow. Shown in dashed line in FIG. 4 is the substantially wide angle range of angular positions of the vane between fully open and fully closed.

The fully closed position corresponds with turning the vane counterclockwise in FIG. 4 to a maximum turning angle E in which the vane pressure side 34 faces axially forwardly to partially block the airflow. Clockwise rotation of the vane 30 to the fully open position corresponds with an opposite turning angle F at which the vane suction side 36 faces axially forwardly for fully opening the flow passages between the adjacent vanes.

Each vane may be rotated about a pivot axis extending through the span of the vane near the midchord, or forward thereof, corresponding with the center of the circular spindle 48 illustrated in FIG. 3. A nominal or design angular position of the vane is illustrated in solid line in FIG. 4 slightly offset from the direction of the axial centerline axis of the engine which is represented by the axial axis X, with the tangential axis Y extending in a circumferential direction around the casing. At the design angular position, the vane has a corresponding angle of attack relative to the incoming airflow with maximum aerodynamic efficiency with minimal, if any, flow separation over its entire outer surface.

However, the substantially wide angle range of operation of the vane 30 between the closed angular position E and the open angular position F relative to the design angular position has a correspondingly large variation in angles of attack of the vane relative to the incoming airflow. Accordingly, aerodynamic performance of the vane correspondingly changes at the off-design positions thereof associated with the wide range of angular positions.

In one method of making the variable inlet guide vane 30 illustrated in FIG. 4, a suitable NACA-series guideline profile 56, illustrated by dotted-line, is initially selected for optimum aerodynamic performance at a corresponding design angle of attack associated with cruise operation for example. As indicated above, the NACA 63-($Cl_0A_4K_6$)06 guide vane profile may be used to conventionally design a corresponding airfoil based on the publicly available NACA technical reports and notes.

For example, this NACA-63 series vane profile has the $A_4K_6$ mean or camber line, a maximum profile thickness of 6% chord length or greater located at 35% chord from the leading edge, with a leading edge radius of 0.297% chord and a trailing edge radius of 0.6% chord.

Modern three-dimensional (3D) Navier-Stokes aerodynamic flow analysis computer software may be used to analyze the aerodynamic performance of the guide vanes.

Although this analysis predicts that the NACA profile 56 has acceptable aerodynamic performance at the design angular position, it experiences significant flow separation along the suction side thereof at large closure angles such as the intermediate closed angle G illustrated in FIG. 4 of thirty-six degrees (36°) and higher. And, substantial flow separation on the pressure side of the NACA profile is predicted at the maximum open position correspondingly with the turning angle F in FIG. 4. Such flow separation corresponds with poor aerodynamic performance for these off-design angles of attack since the NACA profiles are optimized for singular angles of attack.

In accordance with the present invention, 3D aerodynamic analysis has been used to define a substantially improved aerodynamic profile for the vane 30 illustrated in FIG. 4 distinctly different than the corresponding NACA profile from which it is derived.

More specifically, it has been discovered that improved performance in the off-design angle of attack positions of the vane 30 may be obtained by increasing the maximum thickness of the NACA profile, and relocating that increased maximum thickness closer to the leading edge of the profile for defining the resulting variable inlet guide vane 30 for reducing flow separation from the pressure and suction sides thereof at the off-design angles of attack within the wide range of angular positions of the vane. Such off-design performance is enhanced while still maintaining efficient aerodynamic operation of the vane at the desired design angle of attack.

As shown in FIG. 4, each radial section profile of the vane 30 has a maximum thickness T represented by the diameter of an inscribed circle between the pressure and suction sides of the vane, which maximum thickness is greater than about eight percent of the length C (8% C) of the vane chord 38; and, with that maximum vane thickness being located less than about thirty-five percent chord length (35% C) form the vane leading edge 40. In comparison with the conventional NACA profile 56, the thickness of the vane is increased as well as relocated closer to the vane leading edge for providing enhanced aerodynamic performance for the off-design angles of attack.

Furthermore, the relatively small leading edge of the NACA profile 56 is preferably increased in size to define the correspondingly thicker leading edge of the vane 30, with the leading edge 40 thereof having a radius R which is greater than about 0.3 percent of the chord length (3% C) associated with the sharp NACA leading edge.

The leading edge 40 of the vane 30 illustrated in FIG. 4 is defined by an inscribed circle of diameter 2R which is preferably larger than the leading edge of the NACA profile. The pressure and suction sides of the NACA profile are defined in a conventional manner by first establishing a desired mean line or camber line between the leading and trailing edges and centering a series of circles varying in diameter from the leading edge to the trailing edge. The locus of the outer tangents of the series of circles defines the corresponding pressure and suction sides of the vane.

The vane 30 illustrated in FIG. 4 may be similarly defined with the substantial departure from the NACA profile for increasing the maximum section thickness and moving it closer to the section leading edge, while preferably additionally increasing the radius of the leading edge for combined performance enhancement.

In the preferred embodiment illustrated in FIG. 4, the maximum thickness T of each vane radial section is greater than or equal to about ten percent of the chord length C (10% C), and is correspondingly located down to about, and preferably equal to, twenty-five percent of the chord length C (25% C) from the vane leading edge 40. The maximum profile thickness also preferably varies from about 10% C at the radially outer tip section 40 to about fourteen percent chord (14% C) at the radially inner root section 44, both at the preferred 25% C location from the leading edge.

Correspondingly, the radius R of the vane leading edge 40 is preferably proportional to the profile maximum thickness, for example eleven percent (11%) or greater thereof. Accordingly, the leading edge radius varies from about 1.1% C for the vane tip 40 to about 1.6% C for the vane root 44. 3D aerodynamic analysis confirms a substantial reduction in flow separation along the pressure and suction sides of the vane over a large range of the open and closed positions of the vane, with the improved combination of increased profile thickness disposed closer to the leading edge and with a correspondingly thick leading edge.

The availability of the 3D aerodynamic analysis software permits further modification of the NACA profile for further aerodynamic performance improvement in the off-design vane positions. In particular, the mean line or camber of the NACA profile 56 may be suitably modified to define the pressure and suction sides 34,36 of the vane for further reducing flow separation therefrom at the different angles of attack relative to the design position.

In this way, the NACA profile 56 may be used as a reference profile which is modified in maximum thickness, chordal location thereof, leading edge radius, and camber to substantially eliminate flow separation of the airflow along both pressure and suction sides 34,36 of the vane at a suitably large range of open and closed angular positions relative to the design position within the entire wide range of angular position. For example, although the NACA profile 56 effects undesirable flow separation along the vane pressure side at the maximum open angular position F of 24°, the improved vane 30 at the maximum open position F has a substantially reduced, if not eliminated, flow separation along the pressure side.

Correspondingly, analysis predicts that the NACA profile 56 experiences substantial flow separation on the suction side thereof at a relatively large intermediate closed position G of 36°, whereas the improved profile of the vane 30 has substantially reduced, if not eliminated, flow separation at the corresponding 36° closed position. In view of the substantially large maximum closed position E of 60°, the complete elimination of flow separation thereat may not be achieved, but since that closed position corresponds with idle operation of the engine, flow separation is not significant for idle performance.

Although the total range of vane angular position from maximum closed E at 60° to maximum open F at an opposite 24° effects a total range of eight-four degrees (84°), substantial improvement in aerodynamic performance of the vane 30 is provided over a large range of off-design angular positions of the vane while still maintaining efficient aerodynamic performance at the desired design position, preferably at cruise operation.

By selectively varying the conventional NACA profile 56, substantial improvement in aerodynamic performance of the variable inlet guide vane may be obtained for the off-design angular positions. However, due to the proven performance of the NACA profiles, variations therefrom should be sparingly made to avoid otherwise compromising overall performance of the compressor, including stall margin for example. Preferably, the radius of the trailing edge 42 of the vane 30 remains at about 0.6 percent of the chord length C, which corresponds with that of the NACA profile 56.

Modern three dimensional aerodynamic analysis may now be used to advantage for customizing a specific profile of the pressure and suction sides 34,36 of the variable inlet guide vane for producing corresponding velocity distributions thereover for maximizing aerodynamic performance not only at the specific design condition, but over a range of off-design angular positions as large a practical.

In the preferred embodiments disclosed above, the maximum thickness of the vane radial sections or profiles is 10% of the chord length at the vane tip 46 and increases to 14% C at the vane root 44, and is located at 25% chord from the leading edge, with the leading edge having a corresponding radius varying from 1.1% C at the tip to 1.6% C at the root. These three elements may be varied in accordance with conventional aerodynamic analysis for maximizing the off-design aerodynamic performance without otherwise compromising performance at the design condition.

Further analysis may be used to optimize the variations in these individual parameters as they collectively affect aerodynamic performance. And, the same analyzes may be used for evaluating cooperating changes in the vane chamber and other portions of the pressure and suction sides for reducing or eliminating undesirable flow separation over a substantial range of angular positions of the vanes.

However, any change in the NACA profiles necessarily changes aerodynamic performance for the specific design angle of attack therefor. The variations in vane profiles described above provide overall benefits due to the required wide angular range of inlet guide vane position, yet would not be beneficial or desirable for fixed stator vanes having singular angular positions in the compressor flowpath.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which

We claim:

1. compressor variable inlet guide vane for a turbofan engine comprising:
   opposite pressure and suction sides extending along a chord between leading and trailing edges and in span from root to tip;
   a spindle fixedly joined to said tip for rotating said vane over a range of angular positions between open and closed; and
   said vane having a maximum thickness between said pressure and suction sides greater than about eight percent of length of said chord, and located at less than about thirty-five percent chord length from said leading edge.

2. A vane according to claim 1 wherein said leading edge has a radius greater than about 0.3 percent of said chord length.

3. A vane according to claim 2 wherein said vane maximum thickness is greater than or equal to about ten percent of said chord length and is located at about twenty-five percent chord length from said leading edge, and said leading edge radius is about eleven percent of said vane maximum thickness.

4. A vane according to claim 2 wherein said vane maximum thickness is greater than or equal to about ten percent of said chord length, and is correspondingly located down to about twenty-five percent chord length from said leading edge.

5. A vane according to claim 4 wherein said leading edge radius is proportional to said vane maximum thickness.

6. A method of making said vane according to claim 2 comprising:
   selecting a NACA-series guide vane profile having a design angle of attack; and
   increasing maximum thickness of said NACA profile, and relocating said increased maximum thickness closer to a leading edge of said profile to define said variable inlet guide vane for reducing flow separation from said pressure and suction sides at angles of attack different than said design angle.

7. A method according to claim 6 further comprising increasing said thickness of said NACA profile at said leading edge thereof to define said leading edge radius of said variable inlet guide vane.

8. A method according to claim 7 further comprising modifying camber of said NACA profile to define said pressure and suction sides of said variable inlet guide vane for further reducing flow separation therefrom at said different angles of attack.

9. A method according to claim 8 wherein said NACA profile is modified in maximum thickness, chordal location thereof, leading edge radius, and camber to substantially eliminate flow separation along both said pressure and suction sides of said variable inlet guide vane at opposite open and closed angular positions of about twenty-four degrees and thirty-six degrees relative to said design angle of attack.

10. A compressor stator comprising:
    an annular casing;
    a row of variable inlet guide vanes extending radially inwardly from said casing; and each vane including:
       opposite pressure and suction sides extending along a chord between leading and trailing edges and radially in span from root to tip;
       a spindle fixedly joined to said tip and pivotally mounted in said casing for rotating said vane over a range of angular positions between open and closed; and
       said vane having a maximum thickness between said pressure and suction sides greater than about eight percent of length of said chord, and located at less than about thirty-five percent chord length from said leading edge.

11. A stator according to claim 10 further comprising an actuation ring pivotally joined to each of said vane spindles for rotating said vanes in unison over said angular range including a design angle of attack between said open and closed positions.

12. A stator according to claim 11 wherein each of said vane leading edges has a radius greater than about 0.3 percent of said chord length.

13. A stator according to claim 12 wherein said vane includes a profile at said tip with a maximum thickness equal to about ten percent of said chord length thereat, and a profile at said root with a maximum thickness equal to about fourteen percent of said chord length thereat, and said maximum profile thicknesses are located at about twenty-five percent chord length from said leading edge, and said leading edge radius is about 1.1% of said chord length at said tip and about 1.6% of said chord length at said root.

14. A stator according to claim 12 wherein said vane maximum thickness, chordal location thereof, leading edge radius, and camber of said vane cooperate to substantially eliminate flow separation along both said pressure and suction sides at open and closed positions of about twenty-four degrees and thirty-six degrees relative to said design angle.

15. A stator according to claim 12 wherein said vane maximum thickness is greater than or equal to about ten percent of said chord length, and is correspondingly located down to about twenty-five percent chord length from said leading edge.

16. A stator according to claim 15 wherein said leading edge radius is proportional to said vane maximum thickness.

17. A compressor variable inlet guide vane for a turbofan engine comprising:

opposite pressure and suction sides extending along a chord between leading and trailing edges and in span from root to tip;

a spindle fixedly joined to said tip for rotating said vane over a range of angular positions between open and closed; and said vane having a maximum thickness between said pressure and suction sides is greater than or equal to about ten percent of length of said chord, and located at about twenty-five percent chord length from said leading edge.

18. A vane according to claim 17 further comprising a camber line varying from a NACA-63 series guide vane profile.

19. A vane according to claim 17 further comprising a trailing edge radius of about 0.6 percent of said chord length.

20. A vane according to claim 19 wherein said leading edge has a radius of about eleven percent of said vane maximum thickness.

* * * * *